United States Patent [19]
Bishop et al.

[11] Patent Number: 5,744,768
[45] Date of Patent: Apr. 28, 1998

[54] LOCKING PLATE FOR STAB TERMINAL FOR FRONT ACCESS CIRCUIT BREAKER

[75] Inventors: Howard Bishop, Salisbury; Keith Singer, Cambridge, both of Md.

[73] Assignee: Philips Electronics North America Corporation, New York, N.Y.

[21] Appl. No.: 713,376

[22] Filed: Sep. 13, 1996

[51] Int. Cl.$^6$ ............ H01H 9/08; H02B 1/04
[52] U.S. Cl. ............ 200/50.01; 200/50.11; 200/50.2; 361/634; 361/652
[58] Field of Search ............ 174/66, 67; 200/50.01, 200/50.02, 50.07, 50.17, 50.21, 50.23, 50.28, 293, 294, 295, 296, 297, 303, 304, 307; 218/1, 22, 155; 248/27.1, 27.3; 335/8, 9, 10, 167, 202; 361/600, 605, 610, 611, 614, 622, 626–631, 634, 636, 640–643, 646, 647, 652, 656, 658, 673, 833, 837, 825

[56] References Cited

U.S. PATENT DOCUMENTS

| | | | |
|---|---|---|---|
| 3,389,307 | 6/1968 | Locher et al. | 317/119 |
| 3,596,142 | 7/1971 | Campanini | 317/112 |
| 4,087,772 | 5/1978 | Grenier | 335/202 |
| 4,351,620 | 9/1982 | Stritt et al. | 403/13 |
| 4,646,199 | 2/1987 | M'Sadoques et al. | 361/353 |
| 4,742,608 | 5/1988 | M'Sadoques et al. | 29/453 |
| 5,047,604 | 9/1991 | Grass et al. | 200/294 |
| 5,225,963 | 7/1993 | Smart | 361/357 |

*Primary Examiner*—Cassandra C. Spyrou
*Assistant Examiner*—Michael A. Friedhofer
*Attorney, Agent, or Firm*—Arthur G. Schaier

[57] ABSTRACT

A locking plate for releasably securing a circuit breaker to a module includes a back portion for supporting a circuit breaker, legs connected to the back portion for releasably engaging a terminal of the circuit breaker and for releasably securing the locking plate to the circuit breaker and means for releasably securing the locking plate to a module. The legs may be angled to facilitate slidable engagement with the terminal of the circuit breaker. The locking plate may also include a flange for offsetting the circuit breaker from the module when the circuit breaker is mounted on the module. The locking plate may also include a handle guard for preventing a switch on the circuit breaker from inadvertently being toggled.

10 Claims, 6 Drawing Sheets

LOCKING PLATE FOR STAB TERMINAL FOR FRONT ACCESS CIRCUIT BREAKER

BACKGROUND OF THE INVENTION

The present invention relates generally to circuit breaker brackets, and, in particular, to a locking plate for releasably securing a circuit breaker to a module.

Generally, circuit breakers and fuses having various constructions are known in the art. Also known in the art are modules which are constructed to receive such circuit breakers or fuses. These modules are typically constructed in accordance with specific manufacturing tolerances and used in combination with respectively adapted circuit breakers or fuses. However, the tolerances of each component (the circuit breaker in combination with the module, or the fuse in combination with the module) are often very precise and do not lend themselves to accept interchangability. That is, if a module is constructed to receive a particularly dimensioned fuse, it is unlikely that the same module could receive a circuit breaker in place of the fuse, notwithstanding that the electrical specifications for the fuse and circuit breaker may be similar.

A need for such interchangability may arise in the situation where a user desires to upgrade a system and change over from fuses to circuit breakers. Such modification may result in a reduction in cost since a fuse, once tripped, must be replaced, while a circuit breaker merely needs to be reset. Therefore, in the situation where it is anticipated that the fuse will be tripped often, the ability to modify the system to replace fuses with circuit breakers results in significant cost savings.

However, a major obstacle facing such modifications may be that the circuit breaker, fuse and/or module, may be designed, constructed and/or manufactured by different companies. A strong likelihood therefore exists that the circuit breaker, fuse, and/or module will not be compatibly designed.

Clips to mount a circuit breaker to a control panel or the like are known in the art. One such example is described in U.S. Pat. No. 4,087,772 to Grenier. However, the mounting clip described in U.S. Pat. No. 4,087,772 is generally constructed to hold the casing sections of the circuit breaker together and for merely mounting the circuit breaker on a control panel or the like.

Heretofore no such locking plate or clip has been constructed to allow for the compatability of a fuse module with a previously incompatible circuit breaker.

Accordingly, a locking plate for releasably securing a circuit breaker to a module that overcomes the aforementioned problems is desired. Moreover, a locking plate that prevents inadvertent contact with the toggle switch of the breaker and ensures a proper alignmnent between the circuit breaker and the module when mounted thereon, is desired.

SUMMARY OF THE INVENTION

Generally speaking, in accordance with the present invention, a locking plate for releasably securing a circuit breaker to a module is provided. In a preferred embodiment, the locking plate includes a back portion for supporting a circuit breaker, legs connected to the back portion for releasably engaging a terminal of the circuit breaker and for releasably securing the locking plate to the circuit breaker and means for releasably securing the locking plate to a module. The legs may have angled surfaces to facilitate slidable engagement with the terminal of the circuit breaker.

The locking plate may also include a flange for proper offsetting of the circuit breaker from the module when the circuit breaker is mounted on the module. The locking plate may also include a handle guard for preventing the on/off switch of the circuit breaker from inadvertently being toggled.

Additionally a circuit breaker assembly is provided. The assembly may include the circuit breaker and the locking plate, which together are mountable on the module. The module may have a finger member that can be used for releasably securing the circuit breaker assembly to the module, and therefore, the locking plate may include an aperture so that the finger releasably engages the aperture when the circuit breaker is releasably secured to the module.

Accordingly, it is an object of the present invention to provide a locking plate for releasably securing a conventional circuit breaker to a conventional module.

Another object of the present invention is to provide a locking plate that is easily securable to a conventional circuit breaker and facilitates the mounting of the circuit breaker to the conventional module.

Still another object of the present invention is to provide a locking plate constructed to be easily releasably secured to the conventional module.

A further object of the present invention is to provide a locking plate that permits a previously incompatibly mountable conventional circuit breaker to be reliably mounted onto the conventional module.

Still another object of the present invention is to provide a locking plate that ensures the proper clearance between the conventional circuit breaker and the conventional module when mounted thereon.

Yet another object of the present invention is to provide a locking plate that prevents inadvertent contact with the toggle switch of the circuit breaker.

Another object of the present invention is to provide an improved circuit breaker assembly adapted to be reliably mounted on a conventional module.

Still other objects and advantages of the invention will in part be obvious and will in part be apparent from the specification.

The invention accordingly comprises the features of construction, combination of elements, an arrangement of parts which will be exemplified in the constructions hereinafter set forth, and the scope of the invention will be indicated in the claims.

BRIEF DESCRIPTION OF THE DRAWINGS

For a further understanding of the invention, reference is had to the following description, taken in connection with the accompanying drawings, in which.

DETAILED DESCRIPTION OF THE PREFERRED EMBODIMENTS

Figure 1:
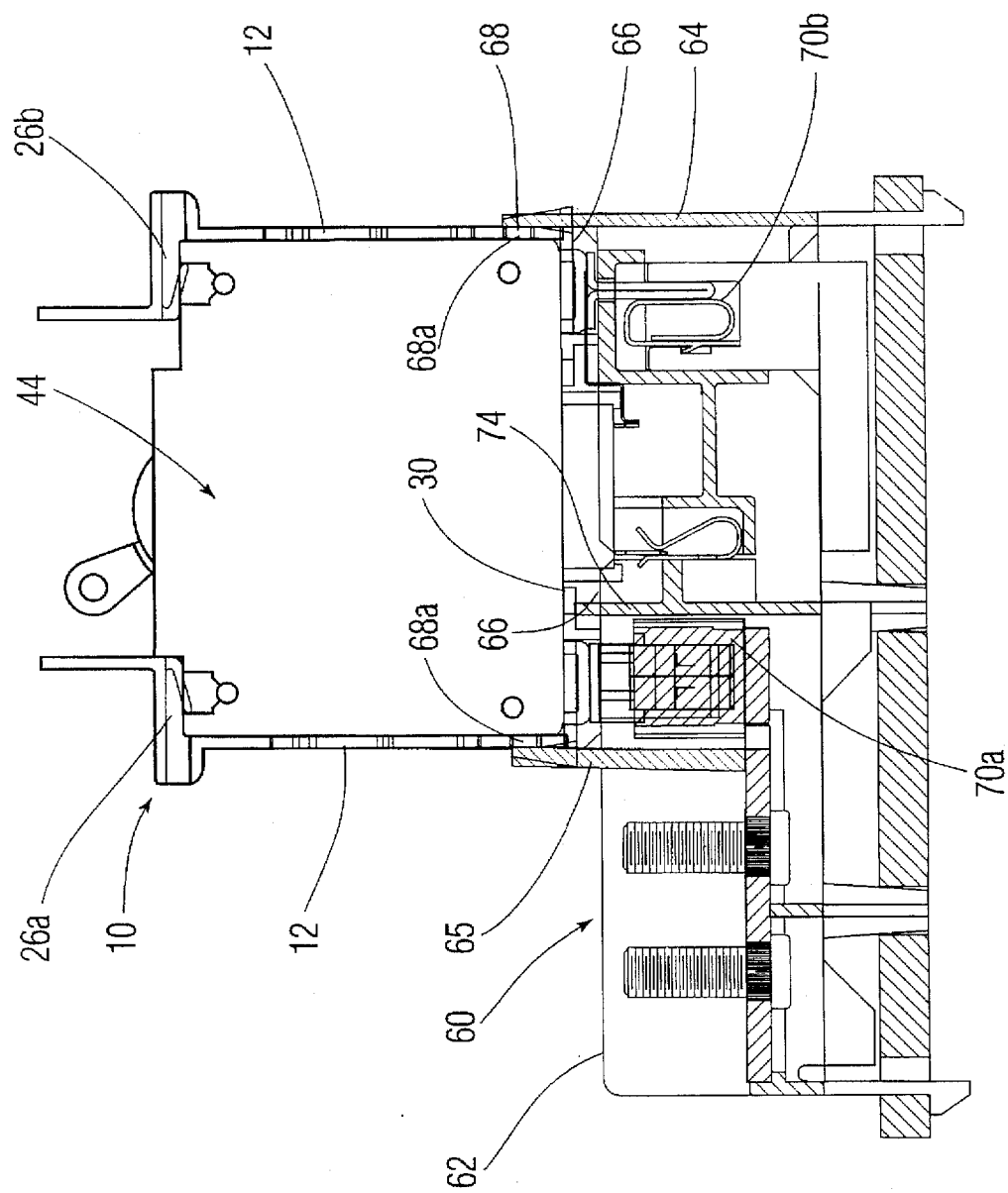
FIG. 1 is an elevational view of an assembly which may include a conventional circuit breaker, a conventional module and a locking plate constructed in accordance with the present invention.

Reference is first made generally to FIG. 1 which depicts a conventional circuit breaker, generally indicated at 44, a conventional module, generally indicated at 60, and a locking plate, generally indicated at 10, constructed in accordance with the present invention. As depicted in FIG. 1, locking plate 10 can be releasably secured to circuit breaker 44, and together, the assembly comprised of circuit breaker 44 and locking plate 10 can be releasably secured to module 60, the details each of which will now be described.

Figure 2:
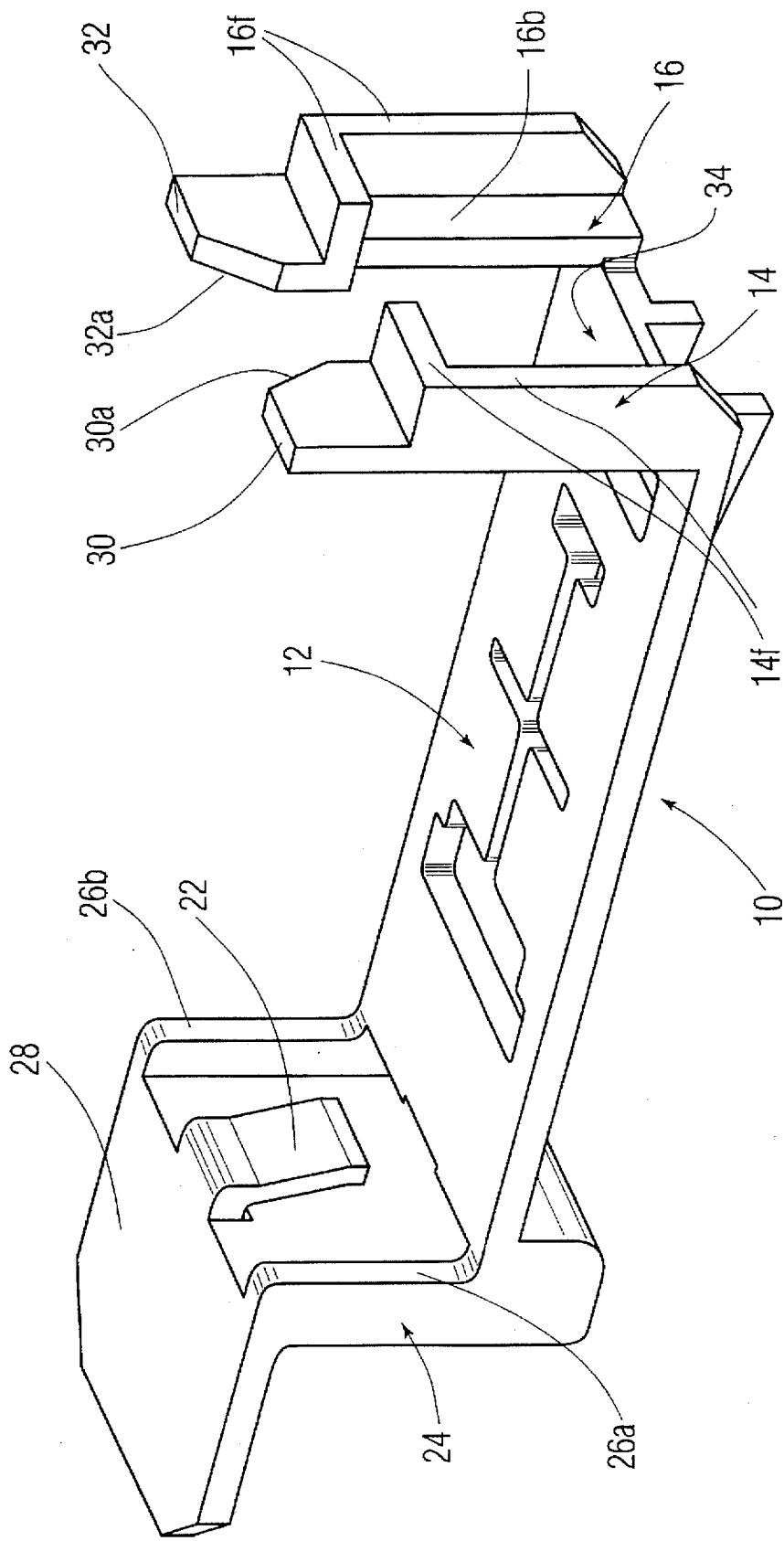
FIG. 2 is a perspective view of a locking plate constructed in accordance with the present invention.
Figure 5:
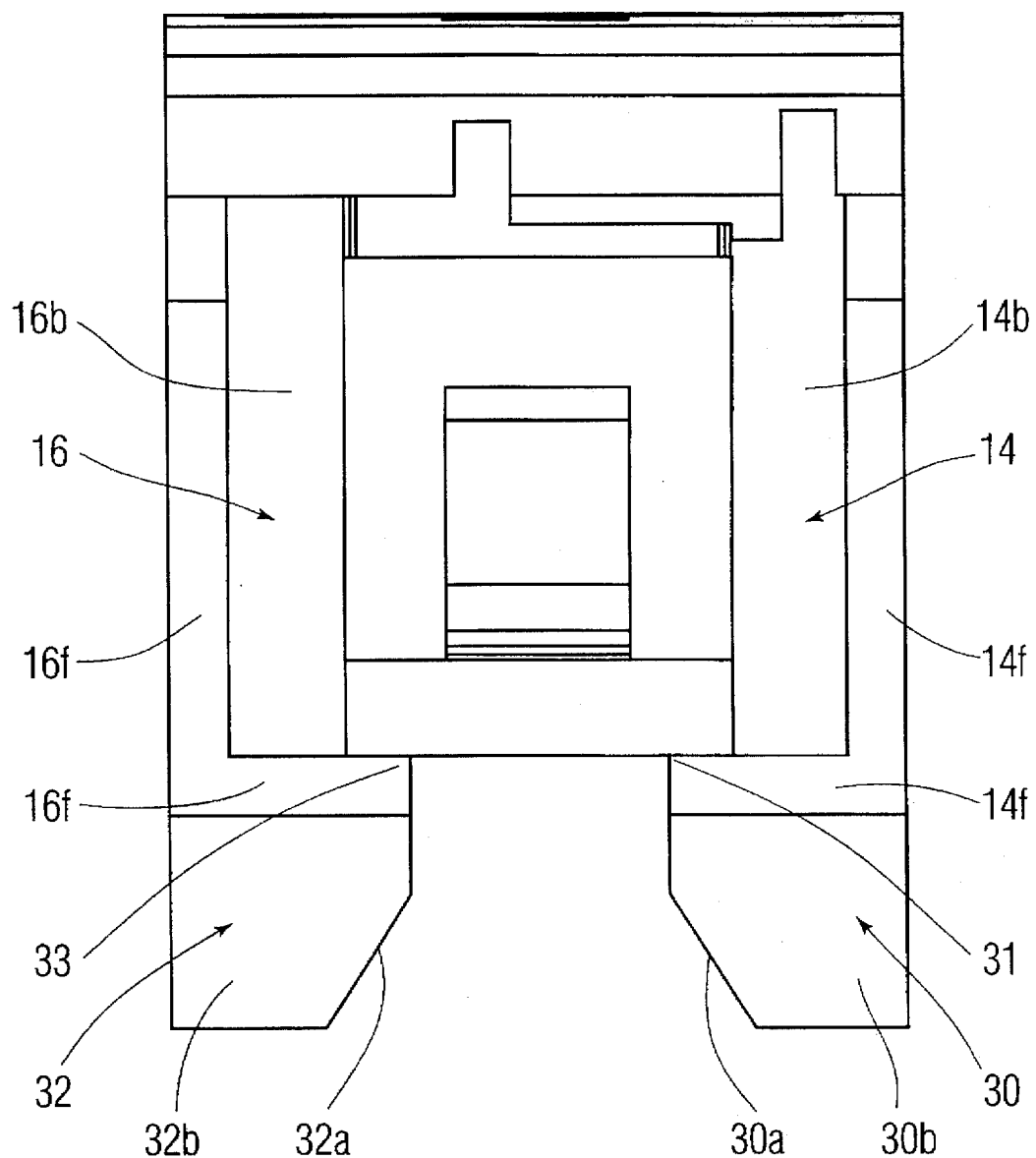
FIG. 5 is a sectional view of the locking plate taken along lines 5—5 of FIG. 4.

Reference is now made to FIG. 2 wherein locking plate 10 is depicted in greater detail. Locking plate 10 which is preferably a unitary member and made of VALOX 420 SEO plastic, includes a back portion 12 and first and second legs 14, 16 extending at least essentially orthogonally therefrom. In this way, an "L-shape" is formed by back portion 12 and legs 14, 16. Legs, 14, 16 are spaced apart from each other so as to define an opening 34 therebetween. Each leg 14, 16 includes a respective top surface 14t and 16t (FIG. 3) for supporting a portion of the aforementioned circuit breaker 44 as further discussed below. Legs 14 and 16 each also include a respective foot 30, 32 extending respectively therefrom. Foot 30 includes a toe portion 31 (see FIG. 5) integrally molded therewith for engaging a terminal of circuit breaker 44 when locking plate 10 is mounted on breaker 44. Similarly, foot 32 includes a toe portion 33 (see FIG. 5) integrally mounted therewith for engaging the terminal of circuit breaker 44 when locking plate 10 is mounted on breaker 44. Foot 30 includes an angled edge surface 30a and foot 32 includes an angled edge surface 32a. Edge surfaces 30a and 32a are in facing alignment and are constructed to facilitate slidable engagement with the terminal of conventional circuit breaker 44. In this way, and as further discussed below, the terminal mount (which forms a portion of the terminal) of circuit breaker 44 can more easily slide between legs 14, 16 (which are resilient) and be held within opening 34 by toes 31 and 33.

First leg 14 also includes a bottom surface 14b. Integral with and depending from bottom surface 14b is an L-shaped flange 14f. Similarly, second leg 16 includes a bottom surface 16b. Integral therewith and depending therefrom is an L-shaped flange 16f. L-shaped flange 14f is a mirror image of and faces L-shaped flange 16f. The friction of L-shaped flanges 14f, 16f will be discussed below.

Figure 4:
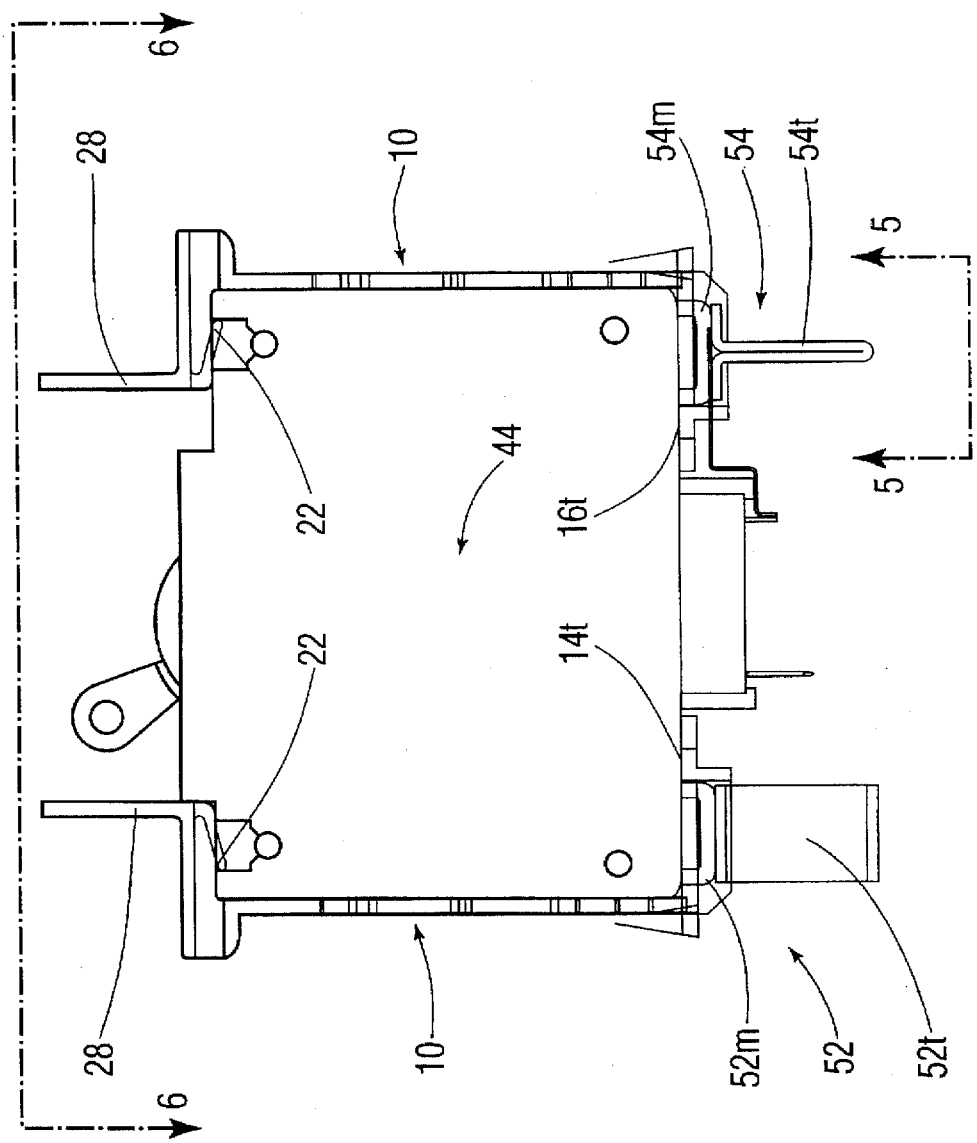
FIG. 4 is an elevational view of a locking plate constructed in accordance with the present invention mounted on a conventional circuit breaker.

As also depicted in FIG. 2, connected to the end of back portion 12 opposite legs 14, 16 of locking plate 10 is an arm 24 which orthogonally extends and depends from back portion 12. A handle guard 28 orthogonally depends from arm 24. As depicted in FIGS. 1 and 4, handle guard 28 extends outwardly over the toggle switch of circuit breaker 44 so as to assist in preventing the circuit breaker switch from an inadvertently being toggled.

Integral with and depending from arm 24 are flanges 26a and 26b for engagement with the housing of circuit breaker 44. In this way, and as depicted in FIGS. 1 and 4, circuit breaker 44 can be securely held in place between top surfaces 14t, 16t, arm flanges 26a, 26b and the inner surface of back portion 12. A resilient tab 22, integrally molded with arm 24, extends therefrom so as to releasably engage a recess formed in the housing of circuit breaker 44 as discussed below.

Figure 3:
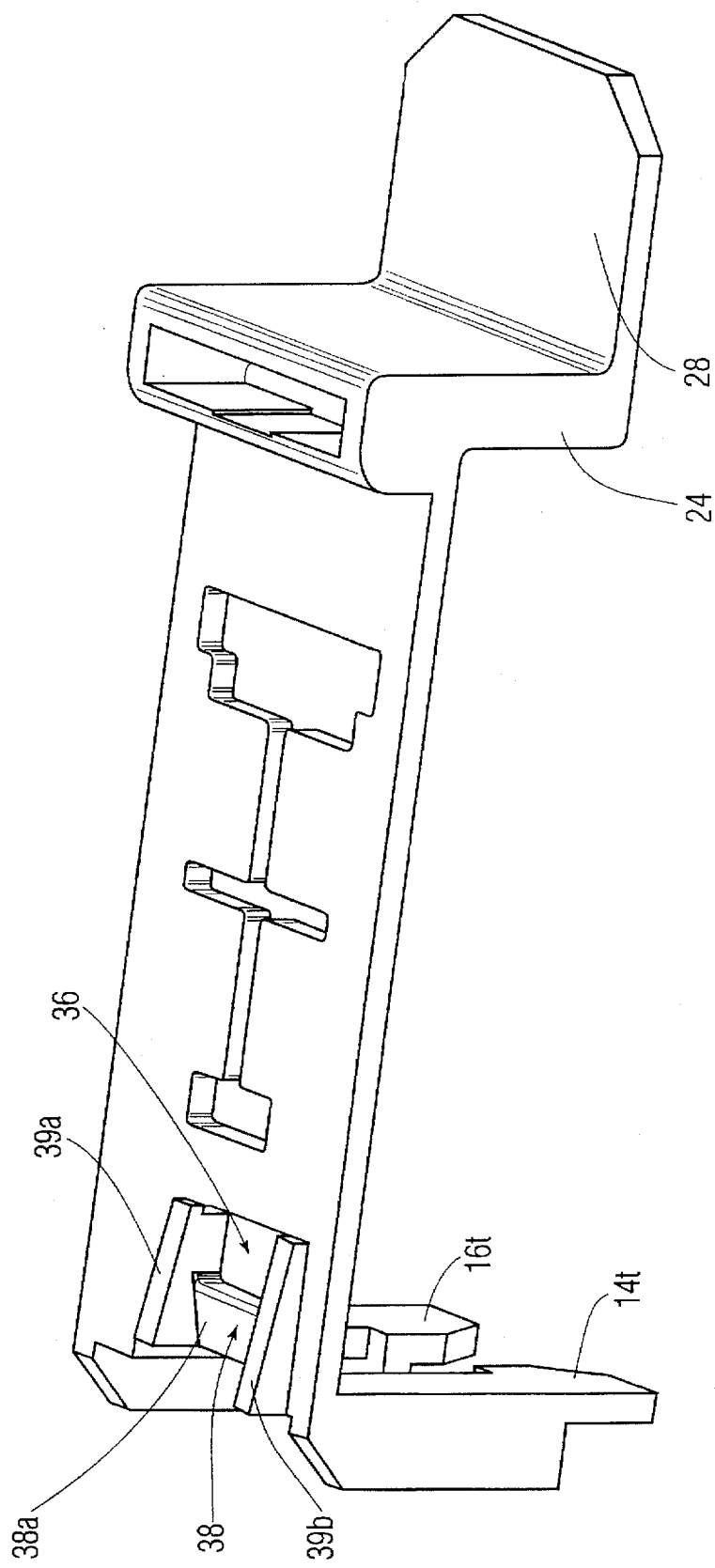
FIG. 3 is a rear perspective view of the locking plate of FIG. 2.

Reference is now made to FIG. 3 which illustrates in greater detail the structure of the rear side of locking plate 10. Specifically, an aperture, generally indicated at 36, is defined in back portion 12. A section 38 of back portion 12 remains below aperture 36.

Section 38 includes a tapered surface 38a so as to facilitate the sliding engagement with a resilient finger 64 or 65 (see FIG. 1) of module 60 as discussed below. Integrally molded and depending flanges 39a, 39b facilitate in guiding finger 64 and 65 into aperture 36 and in maintaining the securing of the resilient fingers within aperture 36 as discussed below.

Reference is now made to FIG. 4 which depicts circuit breaker 44 with two locking plates constructed in accordance with the present invention, mounted on each side thereof. It will be understood from the discussion below that the symmetry of the circuit breaker permits an identically constructed locking plate 10 to be mounted on either side thereof.

Figure 6:
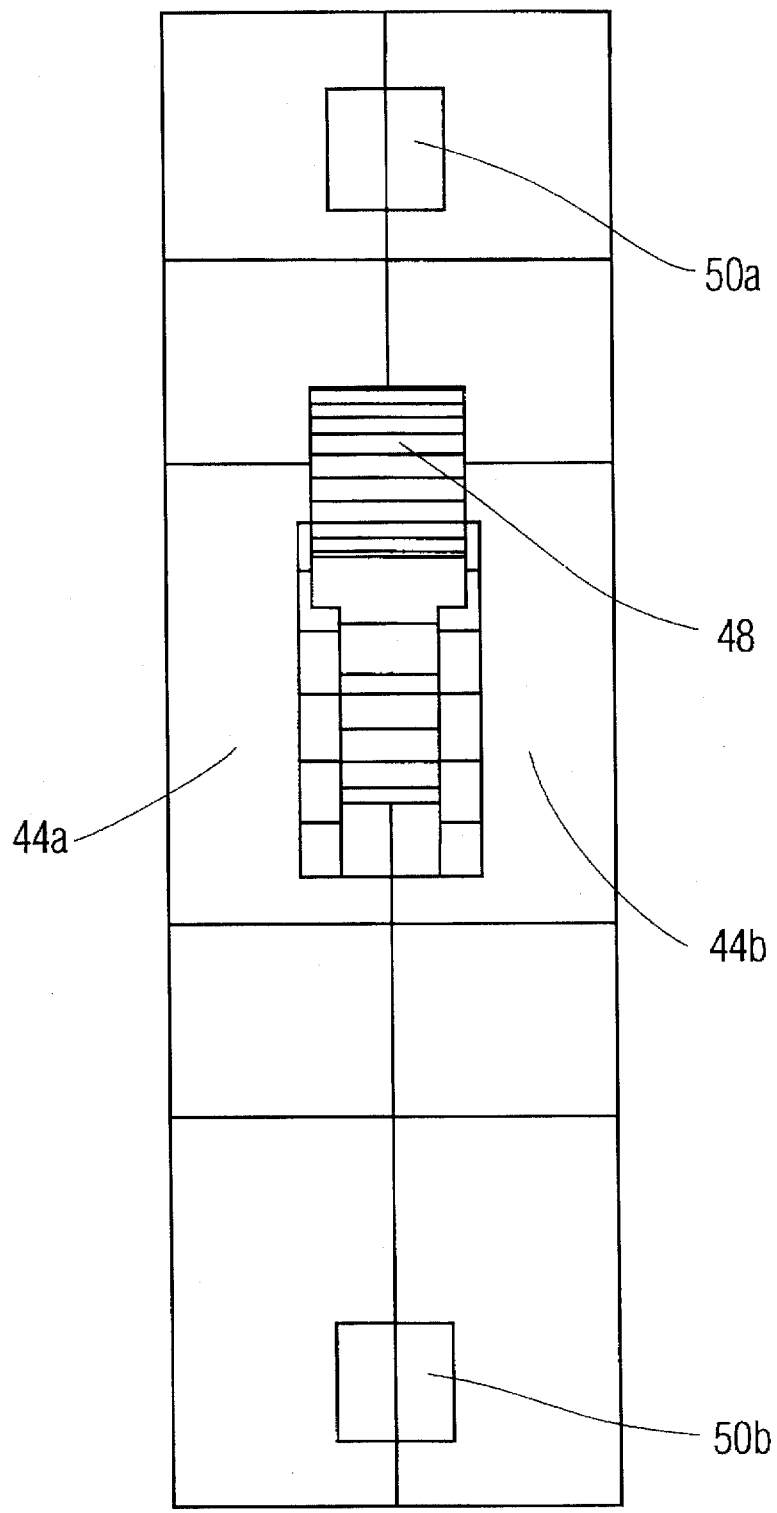
FIG. 6 is a sectional view of the conventional circuit breaker taken along lines 6—6 of FIG. 4.

Circuit breaker 44 may be a conventional circuit breaker manufactured by AIRPAX® of Cambridge, Md. under the circuit breaker family type LEL, although it is understood that minor modifications can be made to locking plate 10 to adapt it to slightly different circuit breaker configurations. The internal construction of circuit breaker 44 is deemed to be well understood of one of ordinary skill in the art. As depicted in FIG. 6, circuit breaker 44 is enclosed by two housing halves 44a, 44b securely mounted together by a plurality of conventional rivets (not shown). A toggle switch 48 is positioned essentially at the middle of the top surface of breaker 44 and secured in place by the meshing of breaker housing halves 44a and 44b. Each housing halve 44a and 44b respectively has a pair of notches formed therein so that when breaker halves 44a and 44b are joined together, recesses 50a and 50b are respectively formed. These recesses receive tab 22 of locking plate 10 when mounted thereon.

Breaker 44 includes two terminals 52 and 54. Each terminal includes a respective stab terminal mount 52m and 54m which are electrically connected to the inner circuitry (not shown) of breaker 44. Terminal mounts 52m and 54m are offset from the bottom surface of the breaker housing. Extending from each stab terminal mount 52m and 54m is a respective stab terminal portion 52t and 54t which may be resistance braze mounted to the respective top surface thereof. As should be clearly understood, since legs 14, 16 of each locking plate 10 engage the stab terminal mounts 52m, 54m of each respective terminal, (and not the stab terminal portion 52t, 54t) the orthogonally orientated terminal portions 52t, 54t do not affect the mounting of each locking plate 10 on breaker 44.

Reference is now once again made to FIG. 1 which depicts conventional module 60. In particular, module 60 may be a four-pole module which may receive up to four circuit breakers of the type described herein, although this construction is by way of example. Whether module 60 can receive more or less breakers does not affect the scope of the present invention. For convenience, reference will only be made to one pole of the four-pole construction since it is understood that each module section is identical.

Specifically, module 60 includes a housing 62 made of plastic. Extending from a first end of housing 62 is an integrally formed resilient finger 64 which extends upward and beyond the top surface 66 of housing 62. An integrally formed latch 68 extends from the end of finger 64. As will be explained in greater detail below, latch 68 of finger 64 slidably engages section 38 (of locking plate 10) and the tapered surface 38a thereof and is thereafter retained within aperture 36. Module 60 also includes at least a second finger 65 which is also integral with housing 62. The construction and operation of finger 65 is identical to finger 64 and reference will therefore not be had to the description of finger 65. That is, it is understood that finger 65 similarly engages aperture 36 in the same manner on the other respective locking plate 10.

As depicted in FIG. 1, module 60 also includes receiver springs 70a, 70b which electrically connect to a metal plate (not shown) within module 60. This construction completes the connection between terminals 52, 54 of circuit breaker 44 and module 60.

Reference is now made to the operation of locking plate 10 with breaker 44 and module 60. Tab 22 of locking plate 10 may be releasably secured into recess 50a of breaker 44. It is understood that the mounting of the second locking plate on the second side of the breaker is performed in the same manner. The tent nature of locking plate 10 thereafter permits legs 14, 16 to be slidably mounted onto stab terminal mount 52m. In particular, by carefully engaging each angled surface 30a, 32a of the respective foot 30 and 32 with terminal mount 52m, each leg 14, 16 will resiliently spread apart until the entire foot 30 and 32 is no longer being pressed outwardly by terminal mount 52m. Thereafter, terminal mount 54m will be releasably secured within opening 34 formed by the spaced apart legs 14, 16 and secured therein by toes 31, 33. The mounting of a second locking plate 10 onto the second side of circuit breaker 44 is achieved in a Rie fashion. Alternatively, legs 14 and 16 may be placed around terminal mount 52m and thereafter, tab 22 is permitted to engage the respective recess. As stated above, the respective terminal mounts 52m and 54m are identically formed and spaced apart from stab terminals portions 52t, 54t so that the orientation of stab terminals portions 52t, 54t do not affect the mounting of locking plate 10 on circuit breaker 44.

To mount the circuit breaker assembly (which may now comprise circuit breaker 44 and two locking plates 10) onto module 60, it is necessary to align the respective stab terminals portions 52t and 54t with its respectively oriented receiver spring 70a or 70b. Pressing circuit breaker 44 and locking plate 10 downward will cause the stab terminals 52t and 54t to be received by the respective receiver springs 70a, 70b and locked in place by a tension fit. Breaker 44 is pressed into module 60 until flanges 14f, 16f contact the top surface 66 of module housing 62. As the assembly is being positioned on and secured to module 60, the angled surface 68a of latch 68 is continuously engaging with tapered surface 38a of section 38. As circuit breaker 44 is further pressed downward. latch 68 engages with the top edge of section 38 and will reset within aperture 36. In this way, breaker 44 will be securely mounted on module 60. It can thus be seen that fingers 64 and 65 maintain the position of and secure circuit breaker 44 onto the module 60. Flanges 39a, 39b assist in maintaining fingers 64 or 65 within aperture 36. As constructed, module 60 includes a fib 74 which extends in a direction parallel to the width of module 60. As depicted in FIG. 1, the bottom surface 30b, 32b of foot 30 and 32 of the left locking plate 10 (as seen in FIG. 1) is additionally supported by the top surface of rib 74 when the assembly is locked in place.

To decouple circuit breaker 44 and locking plate 10 (the assembly) from module 60, fingers 64 and 65 can be easily pried away from aperture 36 so that the assembly can be lifted away from module 60. Since springs 70a, 70b only retain terminals 52, 54 by a tension fit, the assembly can be easily disengaged from module 60. To remove locking plate 10 from circuit breaker 44, legs 14, 16 can be pried away from one another so as to permit terminal 52 (and therefore terminal mount 52m) to disengage from toes 31, 33 and be removed from aperture 34. This can be similarly done for the second locking plate on the second side of the circuit breaker.

By providing a locking plate constructed in accordance with the present invention, a device for interchanging fuse holder/block with circuit breakers is provided. Such a device permits for the upgrade of many circuits currently in place without the need for major modifications. A locking plate constructed in accordance with the present invention will therefore result in significant cost savings. Moreover, a locking plate with the novel handle guard prevents inadvertent contact with the toggle switch of the breaker. Similarly, a locking plate constructed in accordance with the present invention makes a conventional module compatible with a previously incompatible conventional circuit breaker. Such a locking plate is easily securable to the circuit breaker and facilitates the mounting of the circuit breaker to the module. The locking plate is also easily securable to the module. Lastly, a locking plate made in accordance with the invention provides the proper clearance between the circuit breaker and the module when mounted thereon.

It will thus be seen that the objects set forth above among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

What is claimed is:

1. A locking plate for releasably securing a circuit breaker to a module, said locking plate comprising:

a back portion for supporting said circuit breaker;

means for releasably securing said locking plate to said module;

securing means, connected to said back portion, for releasably engaging a terminal of said circuit breaker, wherein said securing means is at least essentially orthogonal to said back portion and includes a first leg and a second leg spaced apart from and in facing relation to said first leg, said first and second legs being releasably engagable with said terminal of said circuit breaker, whereby said terminal of said circuit breaker is intermediate said first and second legs when said locking plate is secured to said circuit breaker.

2. The locking plate as claimed in claim 1, wherein said first and second legs are resilient.

3. The locking plate as claimed in claim 2, wherein at least one of said first and second legs includes an angled surface to facilitate slidable engagement with said terminal of said circuit breaker.

4. The locking plate as claimed in claim 1, and including a flange connected to said securing means for offsetting said circuit breaker from said module when said circuit breaker is mounted on said module.

5. The locking plate as claimed in claim 1, wherein each of said first and second legs includes a flange depending respectively therefrom, each of said flanges offsetting said circuit breaker from said module a predetermined distance when said circuit breaker is mounted on said module.

6. The locking plate as claimed in claim 1, and including a handle guard for preventing a handle on said circuit breaker from inadvertently being displaced from a first position to a second position.

7. The locking plate as claimed in claim 1, wherein said means for releasably securing said locking plate to said module includes an aperture defined therein, said aperture defined to releasably receive a finger connected to said module.

8. The locking plate as claimed in claim 1, wherein said securing means includes a resilient tab for engaging a recess formed in said circuit breaker housing, said tab assisting in securing said locking plate to said circuit breaker.

9. A locking plate for releasably securing a circuit breaker to a module, said locking plate comprising:

a back portion for supporting said circuit breaker;

securing means, connected to said back portion, for releasably securing said locking plate to said circuit breaker;

means for releasably securing said locking plate to said module; and a handle guard connected to said back portion for preventing a handle on said circuit breaker from inadvertently toggling from a first position to a second position.

10. A circuit breaker assembly mountable on a module, said assembly comprising:

a circuit breaker including at least one terminal electrically contactable with said module;

module securing means for releasably securing said looking plate to said module; and a locking plate for releasably securing said circuit breaker to said module, said locking plate including a back portion for supporting a circuit breaker, securing means connected to said back portion for releasably securing said locking plate to said circuit breaker, wherein said securing means is at least essentially orthogonal to said back portion and includes a first leg and a second leg spaced apart from and in facing relation, to said first leg, said first and second legs being releasably engagable with said terminal.

* * * * *